United States Patent [19]
Guez et al.

[11] Patent Number: 5,942,281
[45] Date of Patent: Aug. 24, 1999

[54] TREATMENT PROCESS FOR TITANIUM DIOXIDE PIGMENTS, NOVEL TITANIUM DIOXIDE PIGMENT AND ITS USE IN PAPER MANUFACTURE

[76] Inventors: Anny Guez, 19, rue Roger Bacon, 75017 Paris; Rémy Lorang, 10, rue des Tilleuls, 68700 Cernay, both of France

[21] Appl. No.: 08/847,728

[22] Filed: Apr. 26, 1997

Related U.S. Application Data

[62] Division of application No. 08/555,053, Nov. 8, 1995, Pat. No. 5,665,466.

[30] Foreign Application Priority Data

Nov. 23, 1994 [FR] France .................................. 94 14017

[51] Int. Cl.$^6$ ................................ B05D 7/00; B05D 1/36
[52] U.S. Cl. ........................ 427/214; 427/212; 427/215; 427/402; 427/419.1; 427/419.2; 427/419.3; 106/443; 106/444; 106/449
[58] Field of Search ..................... 427/212, 214, 427/215, 402, 419.1, 419.2, 419.3, 419.7; 106/443, 444, 449

[56] References Cited

U.S. PATENT DOCUMENTS

| | | | |
|---|---|---|---|
| 2,668,776 | 2/1954 | Miller | 106/300 |
| 3,330,798 | 7/1967 | Deissmann et al. | 260/39 |
| 3,513,008 | 5/1970 | Lawrence | 106/300 |
| 3,767,455 | 10/1973 | Claridge et al. | 117/65.2 |
| 3,926,660 | 12/1975 | Holle et al. | 106/300 |
| 4,461,810 | 7/1984 | Jacobson | 428/530 |
| 5,554,216 | 9/1996 | Baidins et al. | 106/442 |

*Primary Examiner*—Shrive Beck
*Assistant Examiner*—Michael Barr

[57] ABSTRACT

Process for the surface treatment of a titanium dioxide pigment, characterized in that it comprises the following steps:

an aqueous suspension of titanium dioxide pigments is formed, in a first step, a layer of alumina phosphate is precipitated on the surface of the pigment, in a second step, a layer of alumina is precipitated over the first layer of alumina phosphate, the pigment is recovered from the suspension;

and titanium dioxide pigment, characterized in that it comprises a titanium dioxide core coated successively with a layer of alumina phosphate, then with a layer of alumina and then with a layer of magnesium oxide.

15 Claims, No Drawings

TREATMENT PROCESS FOR TITANIUM DIOXIDE PIGMENTS, NOVEL TITANIUM DIOXIDE PIGMENT AND ITS USE IN PAPER MANUFACTURE

This application is a division of application Ser. No. 08/555,053 filed Nov. 08, 1995 which application is now U.S. Pat. No. 5,665,466.

BACKGROUND OF THE INVENTION

The present invention relates to a process for the surface treatment of a titanium dioxide pigment, to a novel titanium dioxide pigment and to the use of this novel pigment and of those obtained by the abovementioned process, in paper manufacture.

It is known that titanium dioxide, in particular in its rutile form, may be used advantageously as an opacifying pigment in paper manufacture. This is because titanium dioxide is a white pigment which has a high refractive index; it is among the compounds which, for an optimum particle size (generally 0.2 to 0.3 μm), best diffuse light.

The incorporation of titanium dioxide into paper usually consists in mixing the titanium dioxide with cellulose fibres which are predispersed in water. More or less efficient binding by electrostatic attraction between the cellulose fibre and the titanium dioxide particles can then take place. The cellulose fibre is by nature negatively charged.

The opacity of the paper pigmented with titanium dioxide depends in particular on the titanium dioxide content of the paper; it is thus a function of the level of binding to the cellulose fibres and the physicochemical retention of the titanium dioxide.

The titanium dioxides currently used as opacifying pigments have a physicochemical retention which may appear insufficient. The physicochemical retention quantifies the ability of the titanium dioxide to be retained on the cellulose fibres of the paper; the level of retention is defined, in this application, as the ratio of the amount of titanium dioxide effectively bound to the cellulose fibres to the total amount of titanium dioxide used during the incorporation. This low level of physicochemical retention is economically damaging to the process, poses problems of pollution and of effluent recycling, and decreases the final opacity properties of the paper or of the laminate.

Moreover, the capacity for physicochemical retention of the titanium dioxide pigments changes as a function of the hardness of the water used to manufacture the paper. Thus, a pigment having a satisfactory level of physicochemical retention for a soft water will not necessarily have this same property for a hard water.

SUMMARY OF THE INVENTION

A first object of the present invention is thus to propose a process for the surface treatment of a titanium dioxide pigment which leads to products having good physicochemical retention on cellulose fibres.

A second object of the invention is to propose a titanium dioxide pigment which is also of high physicochemical retention.

With this aim, the invention relates firstly to a process for the surface treatment of a titanium dioxide pigment, characterized in that it comprises the following steps:

an aqueous suspension of titanium dioxide pigments is formed, in a first step, a layer of alumina phosphate is precipitated on the surface of the pigment, in a second step, a layer of alumina is precipitated over the first layer of alumina phosphate, the pigment is recovered from the suspension.

The invention also relates to a titanium dioxide pigment comprising a titanium dioxide core coated successively with a layer of alumina phosphate, then with a layer of alumina and then with a layer of magnesium oxide.

The invention next relates to a process for the surface treatment of a titanium dioxide pigment, characterized in that the above process is used and in that, after the second step for precipitation of the layer of alumina, a layer of magnesium oxide is precipitated on the pigment.

Lastly, the invention relates to the use, in paper manufacture or in the manufacture of paper laminate, of the above pigment or of those obtained by the processes described above.

The pigment as defined above or obtained by one of the processes described above is of high physicochemical retention. Generally, such a pigment makes it possible for the paper to retain good opacity. In addition, it usually has good light-fastness.

DETAILED DESCRIPTION OF THE INVENTION

The invention relates firstly to a process for the surface treatment of a titanium dioxide pigment, characterized in that it comprises the following steps:

an aqueous suspension of titanium dioxide pigments is formed, in a first step, a layer of alumina phosphate is precipitated on the surface of the pigment, in a second step, a layer of alumina is precipitated over the first layer of alumina phosphate, the pigment is recovered from the suspension.

The treatment thus consists in making a first layer of alumina phosphate directly on the surface of the pigment, and then in making a second layer, this time of alumina, over the first layer of alumina phosphate.

An aqueous suspension of titanium dioxide pigments comprising titanium dioxide mainly in rutile form is used as starting substance. This suspension is formed by any means known to those skilled in the art such as, for example, by the sulphate or chlorine processes.

The concentration of titanium dioxide pigments in this suspension usually ranges between 100 and 500 g/l.

This dispersion may optionally contain a dispersing agent so as to disperse and stabilize it. It may be obtained in particular by grinding a dispersion of titanium dioxide using the said dispersing agent. The dispersing agent may be chosen from the following products: 2-amino-2-methyl-1-propanol, potassium or sodium tetrapyrophosphate, potassium or sodium hexametaphosphate, or alkali metal salts of polyacrylic acid polymer or copolymer, such as the ammonium or sodium salt of polyacrylic acid. When phosphate-based compounds are used, they are generally present in a concentration of the order of from 0.1 to 0.5% by weight, expressed as $P_2O_5$, relative to the weight of the titanium dioxide.

The surface treatment process is generally carried out at a temperature above 60° C. This temperature is maintained throughout the treatment, but it may also be envisaged simply to raise the temperature of the starting dispersion to 80° C., and then to continue the treatment without a source of heat.

The first step of the treatment consists in depositing a layer of alumina phosphate on the surface of the pigment by precipitation.

Here and throughout the description, the term alumina phosphate refers to an aluminium phosphorus oxyhydroxide compound. More particularly, this aluminium phosphorus oxyhydroxide precipitated on the surface of the titanium dioxide pigment according to the invention may be defined as being obtainable by precipitation under the operating conditions described below.

This aluminium phosphorus oxyhydroxide thus obtained is the material which contributes in particular to the various properties, including those of retention and of light-fastness, of the pigment according to the invention.

Usually, this first layer of alumina phosphate is precipitated from an aluminium salt and a phosphorus compound, in particular in the form of a solution.

As regards the amount of aluminium salt introduced during the first step, this amount is preferably between 0.5 and 3% expressed as weight of $Al_2O_3$, relative to the weight of the titanium dioxide.

Even more preferably, 0.5% to 2% thereof may be introduced.

The aluminium salts used are generally basic hydroxylated salts; sodium aluminate, basic aluminium chloride and aluminium hydroxide diacetate may be chosen in particular. Alumina sulphate may also be used.

As regards the phosphorus compound used in the first precipitation step, it may be introduced more particularly in an amount of at least 0.5% by weight of $P_2O_5$ relative to the weight of the titanium dioxide, and more particularly between 0.5 and 5%.

Preferably, between 1% and 4% thereof may be introduced.

The amounts of aluminium salt and of phosphorus compound which are introduced are modified so as to precipitate a layer of alumina phosphate having a P/Al molar ratio of not more than 2, preferably of at least 0.5, or even of at least 1, and even more preferably of between 1.5 and 2.

If a phosphate-based dispersing agent has been used to stabilize the starting titanium dioxide dispersion, the amount of phosphate provided by the dispersing agent is subtracted from the amount of phosphate introduced during the first precipitation step.

The phosphorus compound may be chosen in particular from phosphoric acid, phosphates such as potassium or sodium tetrapyrophosphate, potassium or sodium hexametaphosphate, or potassium or sodium tripolyphosphate.

Advantageously, the phosphorus compound and then the aluminium salt are introduced successively into the aqueous suspension of titanium dioxide pigments.

In general, the first precipitation step takes place at a pH which is suitable to precipitate the alumina phosphate as described above. This pH may be between 4 and 8. However, the first precipitation step is usually carried out at an acidic pH, preferably at a pH of not more than 6. This pH may more preferably be between 4 and 6.

The pH is controlled by the addition of phosphoric acid and/or of another acid such as sulphuric acid or hydrochloric acid. It may also be controlled by the simultaneous and/or alternate introduction of the phosphorus-based compound and the aluminium salt which together will form the alumina phosphate precipitate. This is the case, for example, when phosphoric acid and sodium aluminate are used during this first precipitation.

The second step consists in depositing a layer of alumina on top of the layer of alumina phosphate.

Here and throughout the description, the expression layer of alumina refers to a precipitate of an aluminium oxide and/or of an aluminium oxyhydroxide.

Usually, this second layer is precipitated using an aluminium salt such as those defined for the precipitation of the first layer.

The amount of aluminium salt introduced is modified so as to obtain a titanium dioxide pigment having a positive zeta potential at high pHs.

During this second precipitation, the amount of aluminium salt introduced may thus be between 1 and 5%, expressed by weight of $Al_2O_3$, relative to the weight of the titanium dioxide. The amount may preferably be between 2% and 4%.

This precipitation usually takes place at the pH required to precipitate the layer of alumina. This pH may be between 3 and 10. This pH is preferably between 3 and 7. The adjustment may be made by adding sulphuric acid.

Maturation steps may be carried out after each precipitation step. These maturation steps consist in stirring the reaction medium obtained after introduction of all the phosphorus compounds and the aluminium salts involved in the first step, and in introducing all the aluminium salt involved in the second step.

The maturation time is preferably of the order of from 5 to 30 min in each step.

After these two precipitation steps, the treated pigments are separated from the liquid phase of the suspension by any known means.

The pigment is then generally washed with water, dried and micronized.

The pigments obtained by such a process usually have a positive zeta potential at pH=5.5.

The invention next relates to a titanium dioxide pigment comprising a titanium dioxide core coated successively with a layer of alumina phosphate, then with a layer of alumina and then with a layer of magnesium oxide.

Here and throughout the description, the term magnesium oxide refers to a magnesium oxide and/or hydroxide. This is usually magnesium dihydroxide.

As an additional feature, such a pigment has a positive zeta potential at a pH of between 7 and 8.

Such a pigment usually comprises 90 to 94.3% by weight of titanium dioxide, 2.5 to 4.5% of alumina phosphate, 3 to 4% of alumina and 0.2 to 1.5% of magnesium oxide. The meanings of alumina phosphate and magnesium oxide are the same as those defined above.

Throughout the description, the various layers which coat the titanium dioxide are generally between 50 and 100 Å in thickness. These layers may be discontinuous, coating the titanium dioxide in a more or less uniform manner.

It is recalled that when a particle in suspension moves through a liquid (under the action of thermal agitation or a gravitational field, for example), it is surrounded by a boundary layer in which the speed of the fluid goes continuously from V, the speed of the particle, to 0 as one moves away from the surface. The decrease in the speed stops quite sharply, making it possible to define a surface external to the particle, separating the molecules that are entrained by this particle from those that are not. This surface is referred to as the shear surface.

In practice, this surface is located at the Stern layer or slightly beyond the same. The mean electrostatic potential at this surface is the zeta potential. Among all the values of the potential between the surface and infinity, this is the only one which is measurable.

The principle of measuring the zeta potential consists in particular in measuring the speed of the particle in suspension moving through an electric field E. If this speed is taken as V, the ratio V/E=U (in m²/volt sec) represents the electrophoretic mobility of the particle. This then gives:

$$\text{Zeta potential} = \frac{3}{2}\frac{\eta U}{\varepsilon}f(Ka)$$

with η: viscosity of the liquid (in pascal sec)
ε: dielectric constant of the liquid (in S.I. units)
f(Ka): factor ranging from ⅔ to 1 depending on the radius of the particle (a) relative to the thickness of the double layer (1/K).

The isoelectric point (IEP) corresponds to the case where the system studied has a zero mean zeta potential. Experimentally, this is reflected in a zero speed of displacement through a non-zero electric field. The isoelectric point is then defined by the pH of a titanium dioxide suspension according to the invention (in the liquid) for which the electrophoretic mobility of a particle of this titanium dioxide in the liquid is zero ("Zeta Potential in Colloid Science", Robert J. Hunter, Academic Press, 1981).

The zeta potential may be measured (as in the examples below) using a machine sold under the tradename LAZER ZEE METER (Model 501-PEN KEM).

Measurement of the zeta potential for an inorganic or organic particle makes it possible to make an assessment of its surface charge in the measuring medium. Now, the binding of the titanium dioxide particles to cellulose fibres is greatly promoted by the electrostatic attraction between the anionic charge on the cellulose fibres and the cationic charge on the said particles, up to pH values which may be as high as 7 to 8.

Thus, the physicochemical retention of the said particles and hence the opacity of the pigmented paper and of a laminated paper based on the said resin-impregnated pigmented paper are very substantially improved, in particular when the waters used during the preparation of the paper have a high ionic concentration. Furthermore, the phenomenon of self-flocculation of the said particles in the presence of these same waters is very substantially attenuated.

This titanium dioxide pigment comprising a titanium dioxide core coated successively with a layer of alumina phosphate, then with a layer of alumina and then with a layer of magnesium oxide may be obtained by the process according to the invention which employs the following steps:

an aqueous suspension of titanium dioxide pigments is formed, in a first step, a layer of alumina phosphate is precipitated on the surface of the pigment, in a second step, a second layer of alumina is precipitated over the fist layer of alumina phosphate, a layer of magnesium oxide is precipitated over the second layer of alumina, the pigment is recovered from the suspension.

The first two precipitation steps are carried out in the same way as in the process described above and with the same variants.

The layer of magnesium oxide may be precipitated using a magnesium salt, in particular a chloride or a sulphate.

The amount of magnesium salt introduced is generally greater than 0.2% by weight of MgO relative to the weight of the titanium dioxide, preferably less than 2% and more preferably between 0.2% and 1.5%.

This precipitation may be carried out at a pH which is suitable to precipitate the layer of magnesium oxide. This pH is usually between 5 and 9, and preferably between 7 and 9. It may be adjusted by solutions of NaOH, KOH or $Na_2CO_3$.

This latter precipitation may be followed by a step of maturation.

Following these three precipitation steps, the treated pigments are separated from the liquid phase of the suspension by any known means.

The pigment is then generally washed with water, dried and micronized.

Lastly, the invention relates to the use, in the production of paper or paper laminates, of the pigments which are described above or which are obtained by the processes according to the invention.

Any process of paper production (or of paper formulation) known to those skilled in the art may be employed. The paper is usually prepared from a mixture of water, cellulose fibres and a pigment according to the invention or one which is obtained according to a process of the invention, optionally in the presence of an agent for improving the wet strength. The said agent consists, for example, of a quaternary ammonium salt of epichlorohydrin-based polymers (for example epichlorohydrin/dimethylamine polymers).

The invention also relates to the use of the pigment, as described above or obtained according to the processes described above, in the production of paper laminates based on paper containing the said pigment and at least one resin (in particular a melamine or melamine-formaldehyde resin). Any paper laminate production process known to those skilled in the art may be employed (using a paper pigmented with the pigment according to the invention) in order to prepare the laminates. The invention is not limited to one specific production process. Thus, for example, the pigmented paper may be impregnated with an aqueous-alcoholic solution of resin, after which several sheets of pigmented paper impregnated with resin are laminated by hot-pressing techniques. The pigmented paper may contain an agent for improving the wet strength.

The examples which follow illustrate the invention without, however, limiting the scope thereof.

EXAMPLES

Tests for measuring the "zeta potential" surface charge (Examples 1 and 2)

Principle

Preparation of a titanium dioxide suspension at a concentration of 30 g/l

Placing at pH=5.5 before centrifugation

Measurement of the filtrate, to which one drop of the 30 g/l suspension has been added, using a zeta meter (LAZER ZEE METER 501 type).

Preparation of the sample:

A 40% slurry is prepared (60 g of filtered water, 40 g of titanium dioxide).

The 30 g/l suspension is prepared using the slurry, in a 250 ml flask, and is completed with filtered water.

The pH of the suspension is adjusted to a value of 5.5 with 0.5 N HCl, with magnetic stirring. The mixture is left to stand for 10 min.

If the pH is less than 0.1 unit away from 5.5, the suspension is centrifuged.

If the pH is more than 0.1 unit away from 5.5, it is readjusted to 5.5 and the mixture is left to stand for a further 10 min.

The centrifugation is carried out in polycarbonate tubes, at 8000 rpm for 5 min at 20° C.

The supernatant (100 ml) is recovered and one drop of the 30 g/l suspension is added thereto.

Reference

Titanium dioxide A marketed by Rhone-Poulenc under the reference RL 18, is a rutile titanium dioxide pigment having a negative zeta potential at a pH of 5.5.

Test of light-fastness in laminates (Examples 1 and 2)

Aim

To measure the performance of titanium dioxide in laminated medium during exposure in an accelerated-ageing machine.

Principle

Production of a laminated test piece based on the titanium dioxide to be tested. Exposure to the Xenotest for 48 h.

Colorimetric measurements of the degradation in colour.

Evaluation of the results by comparison with standards.

Production of the test piece

A sheet of about 350 g/m² is drawn from a suspension of 7.5 g of cellulose and 6.3 g of titanium dioxide in 500 ml of water, flocculated with aluminium sulphate.

After drying, the sheet is impregnated by soaking in a 33% solution of melamine-formaldehyde (INILAM RP 285) and is then dried.

The following stack is pressed between two polished plates: 1 overlay, 2 laden impregnated sheets, 1 unladen impregnated sheet.

Pressing conditions: 40 cm×40 cm plates, P=56 bar, T=130° C., t=15 min.

Xenotest exposure

Duration: 48 h, hygrometry: 90%, irrigation: 30 sec/15 min.

Expressing the results—Standard reference

Calorimetric measurements and calculation of the CIELAB colour difference ΔE. Readjustment using the values found for the standards exposed in the series (ΔE=1.2 for the sample of titanium dioxide A, which corresponds to a rutile titanium dioxide pigment having a positive zeta potential at a pH of 5.5).

Example 1

Deposition of a Layer of Alumina Phosphate and a Layer of Alumina

A suspension of titanium dioxide with a concentration of 900 g/l is used as starting substance. It was ground in the presence of 0.2% by weight of potassium tripolyphosphate relative to the weight of the titanium dioxide, and then diluted to 350 g/l.

It is maintained at a temperature of the order of 60° C.

First layer

The following are added to the dispersion:

2.5% by weight of $P_2O_5$ in the form of a phosphoric acid solution,

1% by weight of $Al_2O_3$ in the form of a sodium aluminate solution.

These additions are performed over 10 min. The pH is adjusted, during the precipitation and at the end of the addition, by adding sulphuric acid, to between 4.8 and 5.2.

Following this, the reaction mixture is stirred for 30 min.

Second layer The following is added to the above reaction medium:

3.5% by weight of $Al_2O_3$ in the form of a sodium aluminate solution.

This addition is performed over 10 min. During this addition, the pH is maintained at between 7 and 7.5 by adding sulphuric acid.

The dispersion is then filtered.

The titanium dioxide pigments obtained are washed with water at 45° C., dried at 150° C. for 15 hours and micronized.

---

Overall chemical analysis by weight:

4.6% $Al_2O_3$
2.5% $P_2O_5$
Test of light-fastness in laminates:

ΔE          1.3
Measurement of the surface charge:

Zeta potential at pH = 5.5    +10
Zeta potential at pH = 7       +2

---

It is seen that the titanium dioxide pigment obtained simultaneously exhibits good light-fastness and a positive zeta potential at a pH of 7.

Example 2

Deposition of a Layer of Alumina Phosphate, a Layer of Alumina and a Layer of Magnesium Oxide A titanium dioxide suspension with a concentration of 900 g/l is used as starting substance. It was ground in the presence of 0.2% by weight of 2-amino-2-methyl-1-propanol relative to the weight of the titanium dioxide, and then diluted to 350 g/l.

It is heated to a temperature of 80° C.

First layer

The following are added to the dispersion:

2.5% by weight of $P_2O_5$ in the form of a phosphoric acid solution,

1% by weight of $Al_2O_3$ in the form of a sodium aluminate solution.

The pH is lowered to 5 by adding phosphoric acid, and is then adjusted to between 4.8 and 5.2 by simultaneously adding sodium aluminate or phosphoric acid. At the end of the addition, the pH is controlled by adding sulphuric acid. The additions are performed over 10 min.

Following this, the reaction mixture is kept stirring for 30 min.

Second layer

The following is added to the above reaction medium:

3.5% by weight of $Al_2O_3$ in the form of sodium aluminate.

The pH rises to 7 on adding sodium aluminate, and is then controlled by simultaneously adding sodium aluminate and sulphuric acid in order to retain this pH of 7. These additions are performed over 10 min. Following this, the reaction mixture is kept stirring for 15 min.

Third layer

The following is added to the above reaction medium:

0.5% by weight of MgO in the form of magnesium sulphate.

The pH is adjusted to between 7 and 8 by simultaneously adding magnesium sulphate and a potassium hydroxide solution.

Following this, the reaction mixture is kept stirring for 15 min.

The dispersion is then filtered.

The titanium dioxide pigments obtained are washed with water at 45° C., dried at 150° C. for 15 hours and micronized.

---

Overall chemical analysis by weight:

4.6% $Al_2O_3$
2.5% $P_2O_5$
0.3% MgO
Test of light-fastness in laminates:

ΔE          1.3
Measurement of the sufrace charge:

Zeta potential at pH = 5.5    +15
Zeta potential at pH = 7       +5

---

It is seen that the titanium dioxide pigment obtained simultaneously exhibits good light-fastness and a positive zeta potential at a pH of 7.

Example 3

Level of Retention

The level of titanium dioxide retained ($TiO_2$ retention level) in an 80 g/m² sheet of paper (or handsheet) prepared, without adding any agent for improving the wet strength, at pHs of 6.5 and 8.5 is measured here for various titanium dioxides.

1) 100 parts by weight of cellulose fibres predispersed at a concentration of 40 g/l in water and 70 parts of titanium dioxide particles predispersed at a concentration of 40% by weight in water (the cellulose fibres +titanium dioxide volume is determined so as finally to obtain an 80 g/m² handsheet) are mixed together with stirring in a beaker.

The pH is then adjusted to a value of 6.5 by adding hydrochloric acid.

The mixture is then diluted with 3 liters of water; 500 cm³ of suspension obtained are withdrawn and used to manufacture a sheet of paper, with the aid of a laboratory handsheet machine (Rapid-Köthen type).

The 80 g/m² handsheet obtained is dried.

2) The operations of paragraph 1 are repeated, the pH being adjusted in this case to a value of 8.5 by adding sodium carbonate.

The 80 g/m² handsheets obtained in paragraphs 1 and 2 are then calcined at 800° C.; the weight of ash obtained is then measured: by this preparation, the ash weight corresponds to the weight of titanium dioxide contained in the handsheet.

The $TiO_2$ retention level then corresponds to the ratio Ash weight/Weight of titanium dioxide employed in the preparation.

This level of retention is measured for three different titanium dioxides, denoted A, B and C (the results are presented in Table 1):

titanium dioxide A corresponds to the titanium dioxide having a negative zeta potential at pH=5.5,
titanium dioxide B corresponds to that of Example 1,
titanium dioxide C corresponds to that of Example 2.

TABLE 1

|  | A | B | C |
|---|---|---|---|
| pH = 6.5 | 5% | 53% | 56% |
| pH = 8.5 | 3% | 22% | 30% |

It is seen that the titanium dioxide pigments treated according to the invention have a much higher level of retention than that of pigment A. Furthermore, it is noted that the pigment of Example 2 obtained by successive precipitation of a layer of alumina phosphate, then a layer of alumina and then a layer of magnesium oxide has a particularly high level of retention, especially at pH=8.5, thereby allowing it to be used with all types of water.

What is claimed is:

1. Process for the surface treatment of titanium dioxide pigments, comprising the steps in the following order:
   (a) forming an aqueous suspension of titanium dioxide pigments,
   (b) precipitating a layer of alumina phosphate on the surface of the pigments,
   (c) precipitating a layer of alumina over the first layer of alumina phosphate, and
   (d) recovering the pigments from the suspension.

2. Process according to claim 1, wherein the surface treatment is carried out at a temperature above 60° C.

3. Process according to claim 1, wherein the layer of alumina phosphate is precipitated from an aluminum salt and a phosphorus compound.

4. Process according to claim 3, wherein about 0.5 to about 3% aluminum salt expressed by weight of $Al_2O_3$, relative to the weight of the titanium dioxide pigments, is introduced during step (b).

5. Process according to claim 4, wherein the aluminum salt introduced during step (b) is selected from the group consisting of alumina sulfate, sodium aluminate, basic aluminum chloride and aluminum hydroxide diacetate and mixtures thereof.

6. Process according to claim 5, wherein at least about 0.5% of phosphorous compound expressed by weight of $P_2O_5$, relative to the weight of the titanium dioxide, is introduced during step (b).

7. Process according to claim 6, wherein about 0.5 to about 5% of phosphorous compound is introduced.

8. Process according to claim 1, wherein in step (b) a layer of alumina phosphate having a P/Al molar ratio of not more than about 2 is precipitated on the surface of the pigments.

9. Process according to claim 8, wherein the P/Al molar ratio is not less than about 0.5.

10. Process according to claim 3, wherein the phosphorus compound introduced during step (b) is selected from the group consisting of phosphoric acid and phosphates and mixtures thereof.

11. Process according to claim 1, wherein step (b) is carried out at a pH of between about 4 and about 8.

12. Process according to claim 11, wherein step (b) is carried out at an acidic pH, of not more than 6.

13. Process according to claim 1, wherein an amount of aluminum salt of about 1 to about 5%, expressed as weight of $Al_2O_3$, relative to the weight of the titanium dioxide pigments is introduced during step (c).

14. Process for the surface treatment of titanium dioxide pigments according to claim 1, wherein, after step (c), a layer of magnesium oxide is precipitated over the second layer of alumina.

15. Process according to claim 14, wherein said layer of magnesium oxide is precipitated from a magnesium chloride or sulfate.

* * * * *